United States Patent
Jakobs et al.

(10) Patent No.: US 12,233,805 B2
(45) Date of Patent: Feb. 25, 2025

(54) METHOD FOR SECURING A PASSENGER IN A MOTOR VEHICLE, AND MOTOR VEHICLE

(71) Applicants: AUDI AG, Ingolstadt (DE); Autoliv Development AB, Vårgårda (SE)

(72) Inventors: Bernd Jakobs, Nuremberg (DE); Jörg Haesser, Gaimersheim (DE); Walter Krönes, Gaimersheim (DE); Christoph Grundheber, Gaimersheim (DE); Johann Unger, Rohrbach (DE); Oliver Adolph, Hebertshausen (DE); Marc Schock, Karlsfeld (DE)

(73) Assignees: AUDI AG, Ingolstadt (DE); AUTOLIV DEVELOPMENT AB, Vårgårda (SE)

( * ) Notice: Subject to any disclaimer, the term of this patent is extended or adjusted under 35 U.S.C. 154(b) by 198 days.

(21) Appl. No.: 18/130,633

(22) Filed: Apr. 4, 2023

(65) Prior Publication Data

US 2023/0311803 A1 Oct. 5, 2023

(30) Foreign Application Priority Data

Apr. 4, 2022 (DE) .......................... 102022107964.3

(51) Int. Cl.
*B60N 2/42* (2006.01)
*B60R 21/0132* (2006.01)
(Continued)

(52) U.S. Cl.
CPC ........ *B60R 21/207* (2013.01); *B60R 21/0132* (2013.01); *B60R 21/01538* (2014.10); *B60R 21/01554* (2014.10)

(58) Field of Classification Search
CPC ..... B60N 2/42; B60N 2/4214; B60N 2/42745
See application file for complete search history.

(56) References Cited

U.S. PATENT DOCUMENTS

| 11,584,332 B2 * | 2/2023 | Sugamata | ............... B60R 22/20 |
| 2009/0024283 A1 * | 1/2009 | Odate | ..................... B60R 22/46 |
| | | | 701/45 |

(Continued)

FOREIGN PATENT DOCUMENTS

| DE | 38 13 557 A1 | 11/1989 |
| DE | 101 52 400 A1 | 7/2002 |

(Continued)

OTHER PUBLICATIONS

German Office Action dated Oct. 4, 2022 for German Application No. 10 2022 107 964.3.

(Continued)

*Primary Examiner* — Long T Tran
(74) *Attorney, Agent, or Firm* — STAAS & HALSEY LLP

(57) ABSTRACT

A motor vehicle and a method secure a passenger in the motor vehicle in a collision. The motor vehicle has a seat including a seat body, which forms a seat surface, and a backrest connected to the seat body. An inertial force acting on the passenger in a collision is transmitted by a seatbelt arrangement to the backrest in such a manner that the latter pivots forwards relative to the seat body counter to the restoring effect of an elastic and/or plastic deformation of at least part of the backrest. A force which counteracts the pivoting-forwards action is generated by a force generator, and transmitted to the backrest, and/or the maximum pivoting path of the backrest is limited by a limiting device in that, when a predetermined reference acceleration is present, a deviation between a present pivoting path of the backrest and a predetermined reference pivoting path is minimized.

21 Claims, 6 Drawing Sheets

(51) Int. Cl.
    *B60R 21/015*    (2006.01)
    *B60R 21/207*    (2006.01)

(56)            References Cited

U.S. PATENT DOCUMENTS

| | | | |
|---|---|---|---|
| 2011/0254330 A1* | 10/2011 | Lich | B60N 2/986 |
| | | | 297/216.1 |
| 2019/0308534 A1* | 10/2019 | Rosenberg | B60N 2/42754 |
| 2020/0238944 A1 | 7/2020 | Huf et al. | |
| 2021/0122270 A1* | 4/2021 | Baer | B60N 2/42745 |
| 2021/0221263 A1* | 7/2021 | Jost | B60N 2/4279 |
| 2021/0323446 A1* | 10/2021 | Christensen | B60N 2/42736 |
| 2021/0394698 A1* | 12/2021 | Tanabe | B60N 2/777 |
| 2022/0048406 A1* | 2/2022 | Ribero | B60R 21/0132 |
| 2022/0048407 A1* | 2/2022 | Ribero | B60N 2/4221 |
| 2022/0219636 A1* | 7/2022 | Yamazaki | B60N 2/42745 |
| 2022/0305970 A1* | 9/2022 | Yadomaru | B60R 22/195 |

FOREIGN PATENT DOCUMENTS

| | | |
|---|---|---|
| DE | 10 2018 123 633 A1 | 3/2020 |
| DE | 10 2019 108 554 A1 | 10/2020 |
| WO | WO 2019/110477 A1 | 6/2019 |

OTHER PUBLICATIONS 10 2022 107 964.3, Apr. 4, 2022, Bernd Jakobs, Audi AG & Autoliv Development AB.

\* cited by examiner

METHOD FOR SECURING A PASSENGER IN A MOTOR VEHICLE, AND MOTOR VEHICLE

CROSS REFERENCE TO RELATED APPLICATIONS

This application claims priority benefit from German Patent Application No. 102022107964.3 filed on Apr. 4, 2022, the content of which are incorporated herein by reference in its entirety.

BACKGROUND

Aspects of the present invention relate to a method for securing a passenger in a motor vehicle in the event of a collision.

Seatbelts serve to protect the passenger in the event of sharp decelerations and to hold the passenger in particular in the seat. The inertial force occurring because of the mass inertia of the passenger is transmitted via the seatbelt arrangement to a component fixed on the vehicle, in particular to a vehicle body or to the backrest of the seat in which the passenger is sitting.

Such seatbelt arrangements can be part of a side airbag of the seat, with airbags which restrain the passenger in the event of a collision being connected to the backrest via belts. Systems of this type are known, for example, from DE 10 2018 123 633 A1 and US 2020/0238944 A1.

The passenger can also be directly buckled up or belted up via a seatbelt arrangement. For example, a vehicle seat with a seat part, which is arranged on a seat substructure, and with a backrest, which is fastened pivotably to said seat part, is thus known from WO 2019/110477 A1. In addition, a seatbelt which is guided through a belt outlet of the backrest, and a load-bearing belt which is firstly connected to a load-bearing belt length adjuster and secondly to an automatic belt retractor of the seatbelt, is provided.

DE 10 2019 108 554 A1 discloses a vehicle seat with a backrest which is connected pivotably to a seat surface and on which a seatbelt is provided. The vehicle seat comprises a damping device for damping a movement of the backrest in a restraint situation, wherein a damping constant of the damping device is adjusted depending on a weight or build of a vehicle occupant.

SUMMARY

Aspects of the present invention relate to a method for securing a passenger in a motor vehicle in the event of a collision, wherein the motor vehicle has a seat which comprises a seat body, which forms a seat surface, and a backrest, which is connected, in particular pivotably, to the seat body, wherein an inertial force acting on the passenger in the seat in the event of a collision is transmitted by a seatbelt arrangement to the backrest in such a manner that the latter pivots forwards relative to the seat body counter to the restoring effect of an elastic and/or plastic deformation of at least part of the backrest.

An aspect of the present invention is a vehicle seat that is improved with respect to the event of a collision.

An aspect of the invention is achieved by a method within the scope of a first example in that a force which counteracts the pivoting-forwards action is generated by a force generator in such a manner, and is transmitted to the backrest in such a manner, that, when a predetermined reference acceleration is present, a deviation between an actually present pivoting path of the backrest and a predetermined reference pivoting path is as small as possible (that is, is minimized).

An aspect of the invention is achieved by a method within the scope of a second example in which the maximum possible pivoting path of the backrest is limited by a limiting device in such a manner that, when the or a predetermined reference acceleration is present, the or a deviation between the or an actually present pivoting path of the backrest and the or a predetermined reference pivoting path is as small as possible (or, minimized). Within the scope of the present invention, the above aspects can be realized as alternatives or in combination.

Aspects of the present invention are based on the concept that, when a negative acceleration or deceleration acting in particular along the longitudinal direction of the vehicle occurs in the event of a collision, energy from the passenger is dissipated as effectively as possible to the backrest via the pivoting-forwards movement of the backrest.

Regarding the first example, the force generator is provided, the force of which additionally counteracts the pivoting-forwards movement of the backrest, and consequently the inertial force of the passenger, specifically in particular during the pivoting process.

Regarding the second example, the limiting device is provided, by a currently released pivoting path or a maximum possible pivoting limit of the backrest is adjustable. Until the pivoting limit is reached, the restoring effect is brought about exclusively on the basis of the plastic or elastic deformation of the backrest. When the pivoting limit is reached, a limiting force preventing further pivoting of the backrest or counteracting further pivoting of the backrest is generated. For this purpose, a relative position of limiting elements running onto one another can be adjusted, with the further pivoting of the backrest being blocked when the limiting elements run onto one another.

By the force generated by the force generator and/or the limiting of the maximum possible pivoting path of the backrest, which is brought about by the limiting device, it is made possible according to aspects of the invention and is correspondingly provided that, when a predetermined reference acceleration is present, a deviation between an actually present pivoting path of the backrest and a predetermined reference pivoting path is as small as possible (or, minimized).

The pivoting path can be a pivoting angle, i.e. the angle between the longitudinal direction or longitudinal axis of the backrest in the unpivoted state and the longitudinal direction or longitudinal axis of the backrest in the pivoted state. The backrest can be pivoted within the scope of bending of the backrest. In particular in this case, the pivoting angle can be expediently defined as the angle between the connecting line between the pivoting point of the backrest and the uppermost point of the backrest in the unpivoted state and said connecting line in the pivoted state.

The reference pivoting path is particularly the pivoting path of the backrest that ideally occurs under defined conditions in the event of a collision or during a restraint situation. The method according to aspects of the invention therefore makes it possible for the pivoting path of the actually occurring pivoting of the backrest to be adapted in the best possible way to the reference pivoting path such that a defined forwards shifting of the passenger takes place in the restraint situation. The reference pivoting path or reference pivoting angle corresponds to the greatest possible forwards movement of the backrest without the passenger coming into contact with fixed components of the motor vehicle, for example a steering wheel and/or a dashboard.

The reference pivoting path is in particular realized such that the forwards shifting of the passenger in the event of a collision is between 100 mm and 500 mm, in particular 300 mm.

The reference acceleration can be the acceleration of the motor vehicle, which occurs at a predetermined speed, e.g. 50 km/h, in the event of a head-on collision with a fixed object.

The backrest can be connected pivotably to the seat body, e.g. by a, lockable, joint. The backrest is connected in the rear region to the seat surface, which is formed by the seat body. The pivot axis of the backrest can run horizontally and along the transverse direction of the vehicle. The seat backrest and the seat body can have a metal basic structure or frame structure and in particular can be padded. The seat body can be connected, in particular in a longitudinally displaceable manner, to the vehicle body via a seat substructure.

Acceleration information relating to the current acceleration of the motor vehicle is ascertained by an acceleration sensor, wherein the force and/or the limiting of the maximum possible pivoting path is predetermined depending on the acceleration information. In this example, the generated force or the pivoting path limiting can be specifically adapted to the measured current acceleration of the motor vehicle. The acceleration sensor can be an acceleration sensor which is present in any case and the sensor data of which are used e.g. in conjunction with the triggering of an airbag.

Regarding the data of the acceleration sensor, provision can be made that the data are used for detecting whether currently there is a collision of the motor vehicle. Specifically, the meeting of a triggering condition can be checked, which is met when the acceleration information indicates that the value of the current acceleration of the motor vehicle exceeds a predetermined acceleration limit value. The acceleration limit value should be selected to be of a sufficient size such that, when it is exceeded, it is extremely likely that there is a collision of the motor vehicle. The generation of the force by the force generator and/or the pivoting path limiting by the limiting device, and in particular the triggering of the airbag, can take place or be initiated when the triggering condition is met.

In an example of the method according to the invention a characteristic curve describing a relationship between the current acceleration of the motor vehicle and the force and/or the maximum possible pivoting path is predetermined and on the basis of which the force is generated and/or the limiting of the maximum possible pivoting path is predetermined. The force currently generated by the force generator or the pivoting path limit is thus predetermined on the basis of the acceleration information. The characteristic curve can be stored by a control device of the motor vehicle, which is designed for carrying out the method according to the invention.

The characteristic curve can be predetermined as an analytical relationship, on the basis of which the force to be generated or the maximum possible pivoting path is calculated. The analytical relationship can be a formula, on the basis of which the force or the maximum possible pivoting path, or an associated variable, e.g. a voltage to be applied to the force generator, which is provided as an electric motor, is calculated. The characteristic curve can also be predetermined as a lookup table in which values relating to the force or the pivoting path limit are predetermined on the basis of acceleration values. The characteristic curve, in particular predetermining the force, can be predetermined depending on the weight or the height of the passenger, said weight or height being ascertained on the basis of passenger information that is described below.

In an example of the method according to the invention the passenger information or passenger information describing the weight and/or the height of the passenger is present and is retrieved within the scope of a vehicle controller, and/or is ascertained by a sensor, wherein the force and/or the limiting of the maximum possible pivoting path is predetermined depending on the passenger information. The energy to be dissipated by the passenger in the event of a collision and the inertial force of the passenger is of course greater, the heavier or taller the passenger is. This basically leads to the pivoting path of the backrest, which is caused, e.g., because of the elasticity of the backrest, in the event of a collision being greater, the heavier or taller the passenger is. This is disadvantageous since, in the case of a small or light passenger, energy is absorbed over a shorter pivoting path than is actually basically available. This in turn results in the restraint force acting on the small or light passenger being unnecessarily as it were increased since basically a greater pivoting path is present. Since the restraint force is intended to be as small as possible (or, minimized) in order to avoid injuries, this is disadvantageous. In order to overcome this disadvantage and to distribute the dissipating of the energy from the passenger over as large a pivoting path as possible, and consequently to optimize it, the force generated by the force generator or the limiting of the maximum possible pivoting path is adapted to the build of the passenger. For example, the force generated by the force generator is higher, the greater the mass and/or the body size of the passenger.

Regarding the first example of the method according to the invention, when or after a maximum pivoting path of the backrest is reached, the value of the force is reduced, in particular is set to zero. Thus, in the event of a collision or restraint, first of all there is an increase in the acceleration of the motor vehicle, and consequently of the pivoting path of the backrest. Subsequently, the acceleration of the motor vehicle reaches a maximum, after which it then returns again to the value zero. This force profile which typically occurs in the event of a collision frequently has the result that, when or directly after the maximum acceleration, and consequently the maximum pivoting path of the backrest, is reached, what is referred to as the rebound effect occurs, in which the passenger is held or "whipped" back into the backrest because of the decreasing acceleration force and the restoring effect which is nevertheless present at this moment. This disadvantageous effect is avoided or is at least mitigated because of the reduction in the force or of the torque when or after the greatest possible deflection of the backrest is reached. The force or the torque is set to zero, and therefore this effect remains as small as possible (or, minimized). To ascertain the time at which the maximum pivoting path is reached, the control device can be designed to evaluate the temporal profile of the acceleration of the motor vehicle on the basis of the acceleration information and in the process to check that a maximum condition is met, the latter being met when the maximum pivoting path is reached. This is approximately the situation whenever the gradient of the acceleration of the motor vehicle becomes zero and its sign changes from plus to minus.

In addition to an aspect of the method according to the invention, an example of the present invention relates to a motor vehicle comprising at least one seat with a seat body, which forms a seat surface, and a backrest, which is connected, in particular pivotably, to the seat body, wherein an inertial force acting on the passenger in the event of a collision can be transmitted by at least one seatbelt arrangement to the backrest in such a manner that the latter pivots forwards relative to the seat body counter to the restoring effect of an elastic and/or plastic deformation of at least part of the backrest. The motor vehicle according to aspects of the invention has a control device which is to activate a force generator and/or a limiting device of the motor vehicle in such a manner that

- a force which counteracts the pivoting-forwards action can be generated by the force generator in such a manner, and can be transmitted to the backrest in such a manner, and/or
- a maximum possible pivoting path of the backrest can be limited by the limiting device in such a manner, that, when a predetermined reference acceleration is present, a deviation between an actually present pivoting path of the backrest and a predetermined reference pivoting path is as small as possible (or, minimized). All of the advantages and features explained in conjunction with aspects of the method according to the invention can correspondingly also be transferred to the motor vehicle according to the invention, and vice versa.

Within the scope of the first example, i.e. when the force which counteracts the pivoting-forwards action, can be generated by the force generator and can be transmitted to the backrest, provision can be made in the case of the motor vehicle according to aspects of the invention that the force generator is an electromechanical actuator or comprises such an actuator. In this case, the force is actively generated. The force generator is an electric motor.

The force generator can be a damping element or comprise such a damping element. In this case, the force is passively generated, namely as a reaction to the pivoting movement of the backrest. The damping or restoring effect of the force generator can be generated by a damping fluid of the damping element. The restoring effect can be adapted here by changing a damping constant of the damping element, for example by changing a diameter of an, approximately orifice-like, opening, through which the damping fluid is pressed during the pivoting movement of the backrest.

For transmitting a tensile force, which is generated by the force generator, to the backrest, the force generator can be connected to the latter via a traction apparatus (such as a metal traction cable or alternatively a belt). The force generator can be connected at a position spaced apart from the backrest or the pivot axis, in particular in or to the seat body. The tensile force acts on a traction apparatus fastening point of the backrest, at which the traction apparatus is fastened to the backrest. A lever arm is provided between the pivot axis and the tensile force, which acts on the backrest or the traction apparatus fastening point, in such a manner that the torque generated by the tensile force counteracts the inertial force of the passenger.

The traction apparatus which firstly is connected to the force generator and secondly is fastened to the backrest is, in particular, a metal, traction cable or a belt. The traction apparatus can be guided about at least one deflecting pulley fastened, in particular rotatably, to the seat body or the backrest, such that the force transmitted via the traction apparatus is deflected.

The traction apparatus can have a first section and a second section. The first section can extend substantially parallel to the seat surface and rearwards with respect to the longitudinal direction of the vehicle between the force generator, which is arranged in or on the seat body, in particular is fastened thereto, and the deflecting pulley. The second section can extend upward substantially along a longitudinal direction of the backrest between the deflecting pulley and a traction apparatus fastening point of the backrest. The tensile force is first of all transmitted from the force generator along the traction apparatus in the horizontal direction to the deflecting pulley. There, the tensile force is correspondingly deflected upwards and finally acts on the backrest via the traction apparatus fastening point.

Within the scope of the second example, i.e. insofar as the maximum possible pivoting path of the backrest can be limited by the limiting device, provision can be made in the case of the motor vehicle according to the invention that the limiting device for limiting the maximum possible pivoting path of the backrest is connected to the backrest via an, in particular metal, locking cable. When the pivoting limit is reached, a limiting force which prevents a further pivoting of the backrest or counteracts a further pivoting of the backrest and which can be transmitted to the backrest via the locking cable can be generated by the limiting device.

In an example, the limiting device has a release device and a rotationally fixed cylinder, wherein the locking cable is wound around the cylinder, in particular repeatedly, between the release device and a traction apparatus fastening point of the backrest, wherein an additional section of the locking cable can be released by the release device. In this example, the backrest is pivoted to the maximum possible amount when the locking cable between the release device and the traction apparatus fastening point is under tensile stress. This tensile stress can first of all be removed by the release of the additional section of the locking cable, specifically until the pivoting of the backrest has progressed to such an extent that the locking cable comes again under tensile stress. The release device can be or comprise a mechanical locking mechanism, in particular with a pawl engaging in a ratchet, wherein the additional section of the locking cable can be released via the locking mechanism and another release of the locking cable is blocked because of the pivoting of the backrest.

In the event of the occurrence of a force which attempts to further pivot the backrest which is in the maximum possible pivoting state, this force is primarily transmitted to the cylinder, and therefore a corresponding counterforce is generated which prevents the further pivoting of the backrest. When, however, the locking cable or the additional section of the locking cable is released, the occurrence of this force which attempts to further pivot the backrest then has the effect that the locking cable is longitudinally displaced or slips around the cylinder, and therefore a corresponding limiting effect is consequently no longer provided.

For the release device, consequently, in order to limit the pivoting path of the backrest, a small force, in comparison to a force typically acting on the backrest in the event of a crash, is sufficient to generate the corresponding counterforce, which is primarily brought about by the winding of the locking cable around the cylinder. This effect is approximately comparable to a ship's rope which is held by a sailor and is wound repeatedly around a mooring bollard between the sailor and the ship. When the sailor keeps the rope under tension between themselves and the bollard, the ship is correspondingly held in position. When the sailor releases said tension and slackens a section of the rope, so that the latter can slip around the bollard, the ship can also correspondingly move further away from the bollard.

According to an aspect of the invention, acceleration information relating to the current acceleration of the motor vehicle can be ascertained by an acceleration sensor, wherein the control device is designed to activate the release device in such a manner that the additional section of the locking cable is released with a length depending on the acceleration information. The released length section of the locking cable consequently defines the current maximally possible pivoting path of the backrest. The released length section thus has the effect that pivoting forwards of the backrest is possible up to the point at which the released length section has slipped completely over the cylinder winding because of the pivoting forwards of the backrest. From this point, the locking cable is under tension, and therefore the further pivoting of the backrest, as described above, ceases.

A relationship between the current acceleration of the motor vehicle and the maximum possible pivoting path is predetermined by the characteristic curve already described in conjunction with the method according to the invention. Specifically, this characteristic curve can predetermine the relationship between the current acceleration and the length of the defined length section of the locking cable.

In the case of the motor vehicle according to the invention, it is conceivable that passenger information describing the weight and/or the height of the passenger is present and can be retrieved within the scope of a vehicle controller, and/or can be ascertained by a sensor, wherein the control device is designed such that the force and/or the limiting of the maximum possible pivoting path is predetermined depending on the passenger information.

When the passenger information is present and can be retrieved within the scope of the vehicle controller, it can already be ascertained and used at the beginning of the journey, for example on the basis of a personalized vehicle key, for identification purposes and within the scope of a locking system of the motor vehicle.

When the passenger information can be ascertained by a sensor, the sensor data of the sensor can be transmitted to the control device which evaluates said data in order to ascertain the passenger information. Specifically, the passenger can be identified, with the passenger information being stored in a memory of the control device. The weight or the height of the passenger can also be directly ascertained or measured, i.e. without recourse to the specific identity of the passenger.

When the passenger information can be ascertained by the sensor, it is conceivable that the sensor is a weight sensor arranged in or on the seat body. The weight sensor can generate a sensor signal which describes a compressive force acting on the seat body and caused by the weight of the passenger. This compressive force depends on the weight of the passenger, and therefore the passenger information can be generated therefrom.

The sensor can be an optical sensor provided for detecting image data of an interior compartment and/or the surroundings of the motor vehicle, for example a camera. The image data can be transmitted to the control device and evaluated for example by face recognition software for identifying the passenger. Information relating to the height of the passenger can also be ascertained on the basis of the image data.

The sensor can be a fingerprint sensor provided for detecting the fingerprint of the passenger. Corresponding sensor signals can also be used for identifying the passenger.

The seatbelt arrangement can be a three-point belt arrangement. In the case of the three-point belt arrangement, a belt strap is anchored to the seat at three points. The first point is located on or in the backrest and is, for example, the position of a belt retractor. The second and third anchoring points are provided on the seat body and are typically defined by the position of an end fitting and a belt buckle.

The seatbelt arrangement can alternatively also be a four-point belt arrangement in which the belt strap is anchored to the seat at four points. The four-point belt arrangement in each case has two lap belts and two shoulder belts, with in particular a central belt buckle being provided for the fastening. Other seatbelt arrangements, such as two-point, five-point and six-point belt arrangements are also conceivable but are rarely used in practice.

The seatbelt arrangement can also be an airbag belt arrangement, by which at least one air sack of an airbag of the seat is connected to the backrest. The airbag can be a side airbag of the seat, with such a side airbag typically having an air sack arranged on the left side and on the right side of the backrest and in each case being inflated in the event of a collision and embracing the passenger laterally and on the front side. The air sacks restrain the passenger in the event of a crash in such a manner that the inertial force of the passenger is transmitted to the air sacks and from the air sacks via the seatbelt arrangement to the backrest. In particular, such a seatbelt arrangement comprises two straps per air sack which are each fastened firstly to the backrest and secondly to the seat body. Such a system is described in DE 10 2018 123 633 A1 that has already been mentioned at the beginning.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
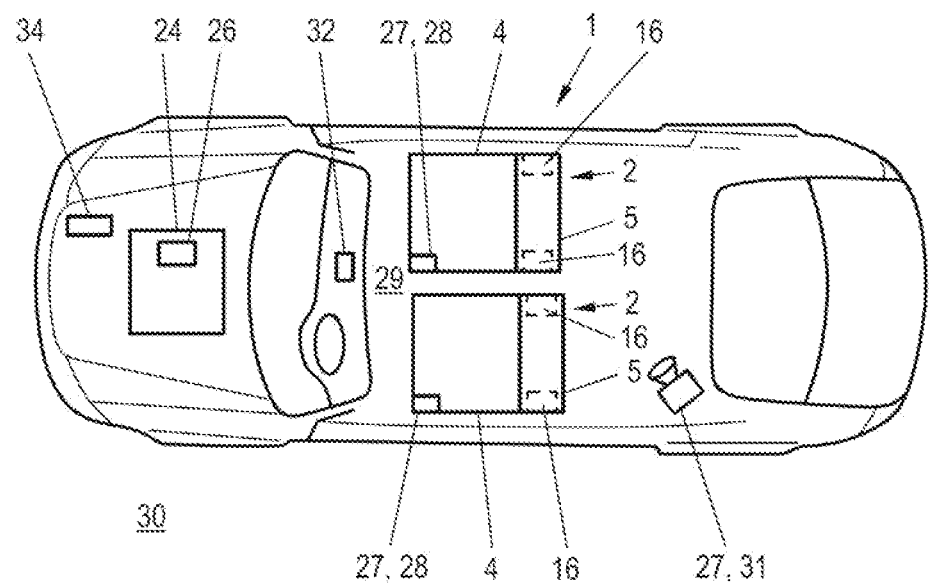
FIG. 1 shows an exemplary embodiment of a motor vehicle, on the basis of which an exemplary embodiment of the method is explained.

Reference will now be made in detail to the preferred embodiments, examples of which are illustrated in the accompanying drawings, wherein like reference numerals refer to like elements throughout.

Figure 2:
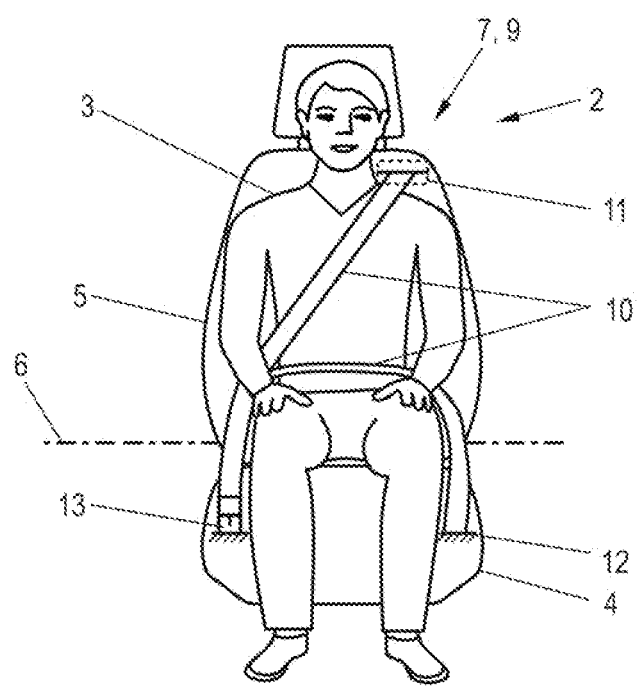
FIG. 2 shows an example of a front view of a seat of the motor vehicle of FIG. 1, in which a passenger is sitting.
Figure 3:
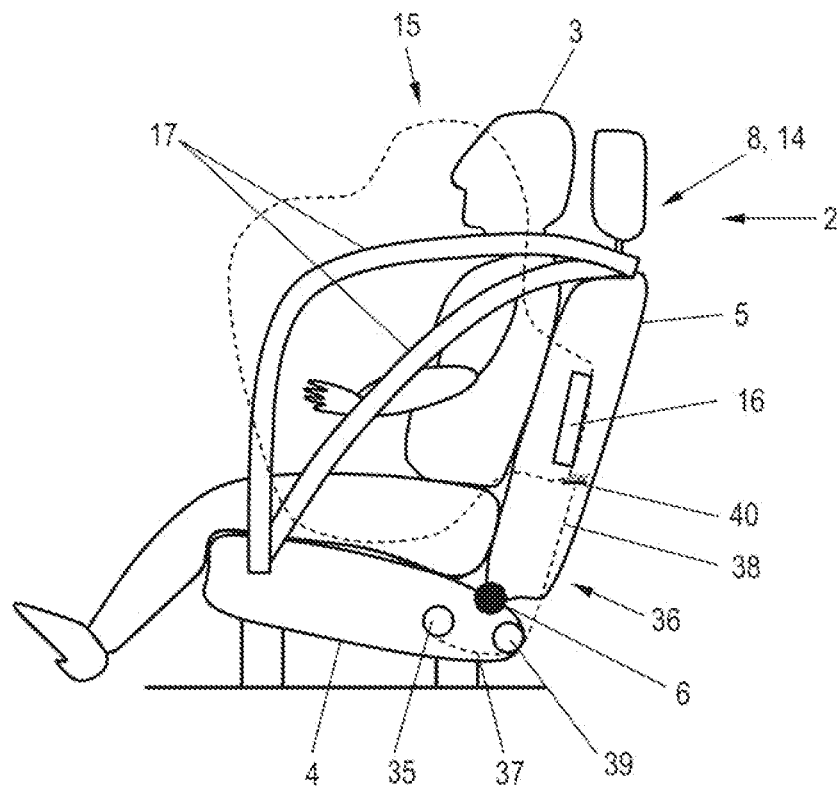
FIG. 3 shows an example of a side view of the seat of FIG. 2 at the beginning of a restraint situation.
Figure 4:
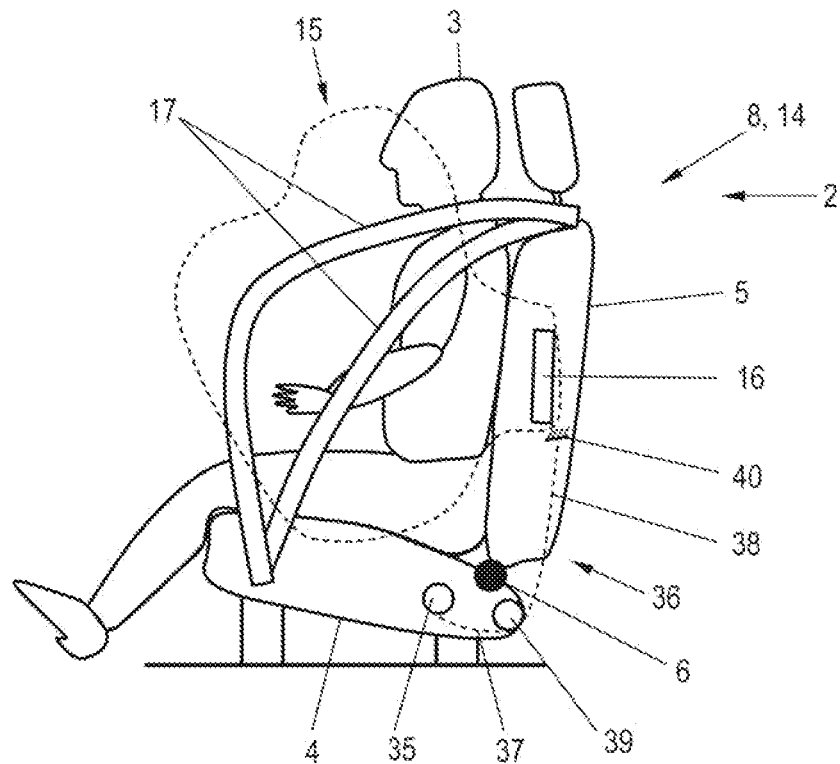
FIG. 4 shows an example of a side view of the seat of FIG. 2 with a temporally progressed restraint situation.

FIG. 1 shows an exemplary embodiment of a motor vehicle 1 according to an example of the invention with two seats 2, namely a driver's seat and a front passenger's seat. A rear bench additionally provided is not illustrated for reasons of clarity. Details regarding the seat 2, namely the driver's seat, are explained with reference to FIGS. 2 to 4. FIG. 2 shows a front view of the seat 2, in which a passenger 3 is sitting, and FIGS. 3 and 4 show a corresponding side view. The points explained in conjunction with the driver's seat basically apply equally to the front passenger's seat.

The seat 2 comprises a seat body 4 and a backrest 5, which is connected pivotably thereto. The backrest is coupled to the seat body via a pivoting joint in such a manner that the backrest 5 is pivotable about a horizontal axis 6. The pivoting position of the backrest 5 can be set forwards and back, and fixed, in accordance with the preferences of the passenger 3. The seat body 4 is fastened in a longitudinally displaceable manner to the vehicle body via a seat substructure, not shown specifically.

The seat 2 comprises a first seatbelt arrangement 7 and a second seatbelt arrangement 8. Regarding the first seatbelt arrangement 7, reference is made to FIG. 2, and, regarding the second seatbelt arrangement 8, reference is made to FIGS. 3 and 4. The first seatbelt arrangement 7 is a three-point belt arrangement 9, by which the passenger 3 in the motor vehicle 1 is belted up or buckled up at the beginning of the journey. The three-point belt arrangement 9 comprises a belt strap 10 which is fastened to the seat 2 at three points. The first fastening point is located in the upper region of the backrest 5. At this point, the belt strap 10 is guided into the interior of the backrest 5 and is connected there to a belt retractor 11. The second fastening point is located laterally on the seat body 4, with the belt strap 10 being fastened to the seat 2 at this fastening point by an end fitting 12. The third fastening point is located on that side of the seat body 4 which is opposite the end fitting 12, with the belt strap 10 being fastened to the seat 2 at this point via a belt buckle 13.

The second seatbelt arrangement 8 is an airbag belt arrangement 14, by which two air sacks of a side airbag 15 of the seat 2 are connected to the backrest 5. In a non-inflated state, the air sacks of the side airbag 15 are each accommodated in a receiving compartment 16, both receiving compartments being provided laterally on the backrest 5. In the event of a collision, the air sacks of the side airbag 15 are deployed in such a manner that they embrace the passenger 3 laterally and on the front side, and an impact of the passenger 3 is avoided or cushioned. The air sacks in the inflated state are each indicated by dashed lines in FIGS. 3 and 4. Each of the two air sacks of the side airbag 15 is fastened to the seat 2 via two straps 17, with each of the straps 17 firstly being fastened to the seat body 4 and secondly to the backrest 5.

Figure 5:
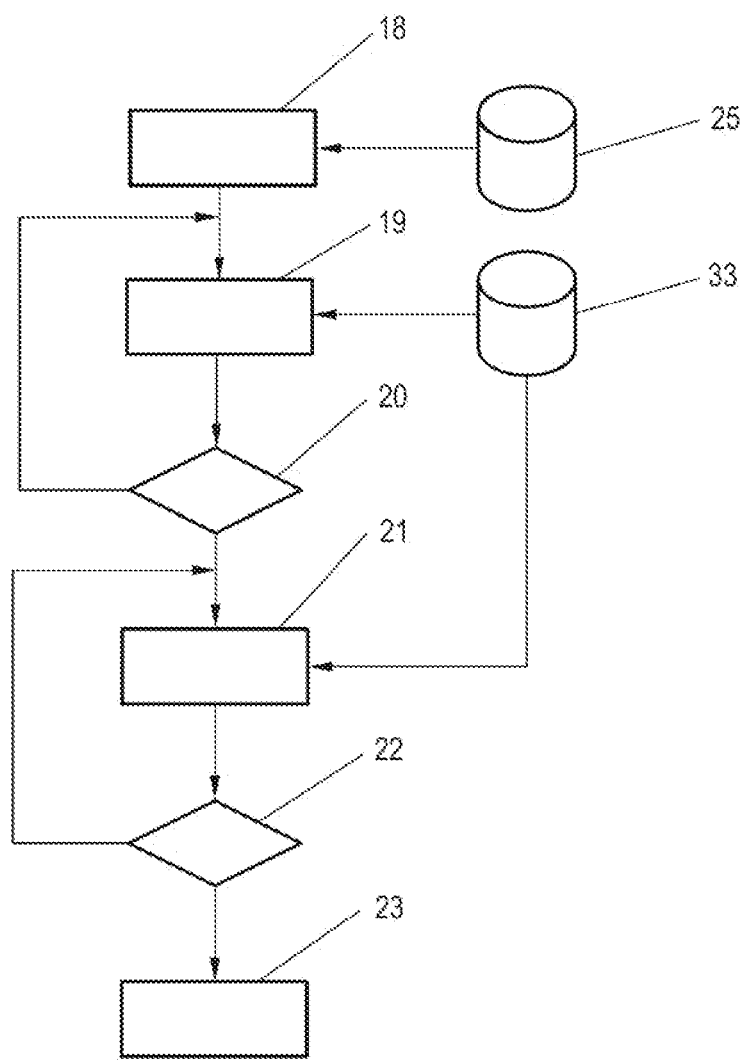
FIG. 5 shows a flow diagram of an exemplary embodiment of a method which is explained on the basis of the motor vehicle of FIG. 1.

An exemplary embodiment of the method according to an example of the invention will be explained below with reference to FIG. 5, specifically with specific reference to FIGS. 1 to 4. The method comprises the operations 18 to 23. A control device 24 of the motor vehicle 1 is provided and designed to carry out the method.

In the first operation 18 of the method, passenger information 25 describing the build, namely the weight and the height, of the passenger 3 is ascertained. In order to detect the passenger information 25, the motor vehicle 1 is unlocked at the commencement of the journey by a personalized key of the occupant 3. In this case, within the scope of a vehicle controller 26, which is implemented by the control device 24, for realizing a locking system of the motor vehicle 1, identity information describing the identity of the passenger 3 is detected. The passenger information 25 is stored in a database of the control device 24 and is retrieved on the basis of the identity information.

The identity information and the passenger information 25 are additionally ascertained by a plurality of sensors 27. This additional ascertainment serves for verification purposes and is not absolutely required, or else is alternatively conceivable to the ascertainment by vehicle controller 26.

The sensor 27 provided is a weight sensor 28 which is arranged in the seat body 4 and by which a measurement value describing a compressive force exerted on the seat surface of the seat body 4 by the passenger 3 is detected.

In addition, optical sensors 31 or cameras which are designed for detecting image data of an occupant compartment 29 and surroundings 30 of the motor vehicle 1 are provided as sensors 27. The image data of the optical sensor 31 for detecting the surroundings 30 can in particular also be used within the scope of the locking system of the motor vehicle 1, for example for verifying the identity information. The image data are evaluated by the control device 24 by image evaluation software.

Furthermore, a fingerprint sensor 32 is provided as sensor 27, by which sensor data relating to the fingerprint of the passenger 3 are detected at the beginning of the journey and evaluated by the control device 24 for ascertaining the identity information.

In the next operation 19 of the method, acceleration information 33 describing the current acceleration of the motor vehicle 1 is ascertained. For this purpose, sensor data of an acceleration sensor 34 of the motor vehicle 1 are transmitted to the control device 24 and evaluated. The acceleration information 33 describes in particular the acceleration currently occurring along the longitudinal direction of the vehicle.

In the next operation 20 of the method, the meeting of a triggering condition is checked. The latter is met whenever the acceleration information 33 indicates that the value of the current acceleration of the motor vehicle 1 exceeds a predetermined acceleration limit value. The acceleration limit value is realized such that, when it is exceeded, it is very highly likely that there is a collision of the motor vehicle 1. When the triggering condition is not met, the method is continued in operation 19, in which the acceleration information 33 is detected or updated.

When the triggering condition is met, the method is continued in operation 21. In this operation, the air sacks of the side airbag 15 are inflated. Furthermore, a force is generated by a force generator 35 and transmitted to the backrest 5. In the present exemplary embodiment, the force generator 35 is an electromechanical actuator, namely an electric motor, which is arranged in the seat body 4. The force generator 35 generates a tensile force which is transmitted to the backrest via a traction apparatus 36. The traction apparatus 36 is a metal traction cable or alternatively a belt.

The traction apparatus 36 comprises a first section 37 and a second section 38. The first section 37 extends between the force generator 35 and a deflecting pulley 39 which is arranged rotatably in the rear region of the seat body 4 and around which the traction apparatus 36 is guided. In the first section 37, the traction apparatus 36 extends substantially parallel to the seat surface and rearwards along the longitudinal direction of the vehicle. The second section 38 extends between the deflecting pulley 39 and a traction apparatus fastening point 40, at which the traction apparatus 36 is fastened to the backrest 5. In the region of the second section 38, the traction apparatus 36 extends upwards in the backrest 5 along the longitudinal direction thereof.

The purpose and further details regarding the traction force will be explained below. Thus, in the event of a collision, an inertial force acts on the passenger 3 caused by the weight thereof. Said inertial force is transmitted via the seatbelt arrangements 7, 8 to the backrest 5. Owing to the inertial force, the backrest 5 is pivoted forwards, FIG. 3 showing the situation directly after the triggering condition is met. FIG. 4 shows the situation in which the collision has temporally progressed in comparison to FIG. 3. As is seen, the inertial force of the passenger 3 in the situation shown in FIG. 4 has caused the backrest 5 to pivot forwards about the pivot axis 6.

The force generated by the force generator 35 counteracts the pivoting forwards of the backrest 5 caused by the inertial force. To generate said force, the passenger information 25 is taken into consideration in such a manner that said force is greater, the greater the weight or the height of the passenger 3. Specifically, on the basis of the passenger information 33, a characteristic curve is predetermined which predetermines the relationship between the current acceleration of the motor vehicle 1 and the value of the force or the tensile force of the force generator 35. To determine the current acceleration, the acceleration information 33 continues to be detected and updated even during operation 21.

The relationship between the current acceleration and the value of the force is realized here in such a manner that, irrespective of the weight or the height of the passenger 3, as long a pivoting path as possible or pivoting angle of the backrest 5 during the collision operation is realized. Specifically, the predetermined characteristic curve is realized in such a manner that, in the event of a fixed reference acceleration of the motor vehicle 1, the pivoting angle of the backrest 5 is always the same as far as possible, specifically independently of the build of the passenger 3.

The specifying of the characteristic curve will be explained below on the basis of a specific example for better understanding. In this example, a first passenger 3 sitting on the driver's seat is built significantly more powerfully than a second passenger 3 sitting on the front passenger's seat, and therefore the inertial force caused by the first passenger 3 in the event of a collision is double the size of that of the second passenger 3.

Figure 6:
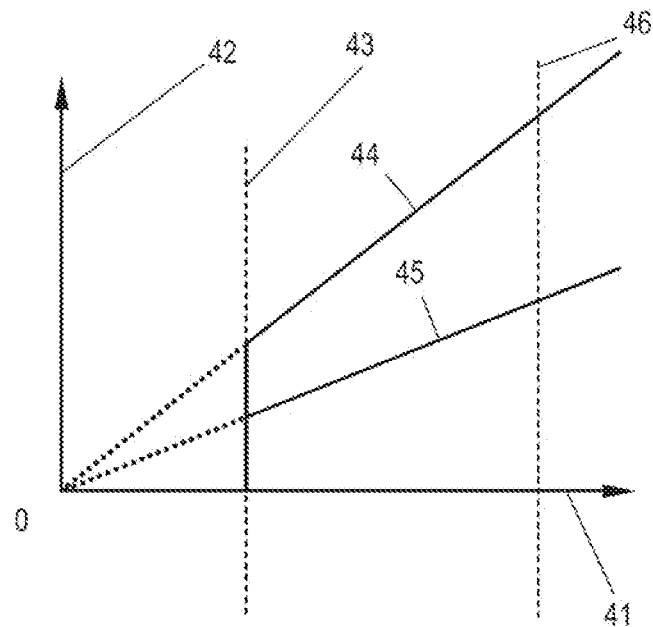
FIG. 6 shows an example of two different characteristic curves which are dependent on passenger information and relate to the relationship between the current acceleration and the tensile force generated by the force generator.

Characteristic curves 44, 45 (solid lines) associated with the two passengers 3 or the passenger information 25 thereof will be explained on the basis of FIG. 6. A system of coordinates is depicted, the abscissa 41 of which relates to the current acceleration of the motor vehicle 1 and the ordinate 42 of which relates to the value of the tensile force generated by the force generator 35. The dashed line 43 identifies the acceleration limit value, upon the exceeding of which the triggering condition is met. The characteristic curve 44 relating to the first passenger 3 and characteristic curve 45 relating to the second passenger 3 are realized in such a manner that the tensile force, when the limit acceleration 43 is exceeded, is double the size for the first passenger 3 than for the second passenger 3 since the inertial force of the first passenger 3 is also double the size of the inertial force of the second passenger 3. This has the effect that the pivoting path or the pivot angle of the backrest 5 is identical as possible, or is ideally identical, for both passengers 3. Accordingly, the same pivoting path for energy absorption is available to both passengers 3, and therefore, in both cases, the restraint forces occurring in the event of a collision are as small as possible (or, minimized).

As has already been mentioned, the acceleration information 33 is continuously updated as operation 21 is being carried out, with the meeting of a maximum condition being checked parallel thereto within the scope of operation 22. Said maximum condition is met as soon as the acceleration of the motor vehicle 1, and consequently the pivoting path of the backrest 5, has assumed or reached a maximum value. Said check is undertaken by the fact that the temporal profile of the acceleration of the motor vehicle 1 is evaluated by the control device 24 to the effect of whether the gradient of the acceleration becomes zero and there is a sign change of said gradient from plus to minus. When the maximum condition is not met, the method is furthermore continued in operation 21 and the tensile force continues to be generated. When the maximum condition is met, the value of the tensile force is reduced, namely is set to zero. In FIG. 6, the maximum condition is met by way of example when the acceleration indicated by the dashed line 46 is reached. The switching off of the tensile force which then occurs prevents the passenger 3 from being hurled back or whipped into the seat 2 in accordance with what is referred to as the rebound effect toward the end of the collision.

In addition, it should be mentioned regarding the force generator 35 that the latter brings about an active generation of force in the exemplary embodiment described. Alternatively, the force generator 35 can also be a damping element, in particular with a damping fluid, with the generated force or the moment being generated as a reaction to the pivoting movement of the backrest 5, and consequently passively. In this case, the characteristic curves 44, 45 and the corresponding force profiles are adjusted by the adjustment of a damping factor of the damping element.

Figure 7:
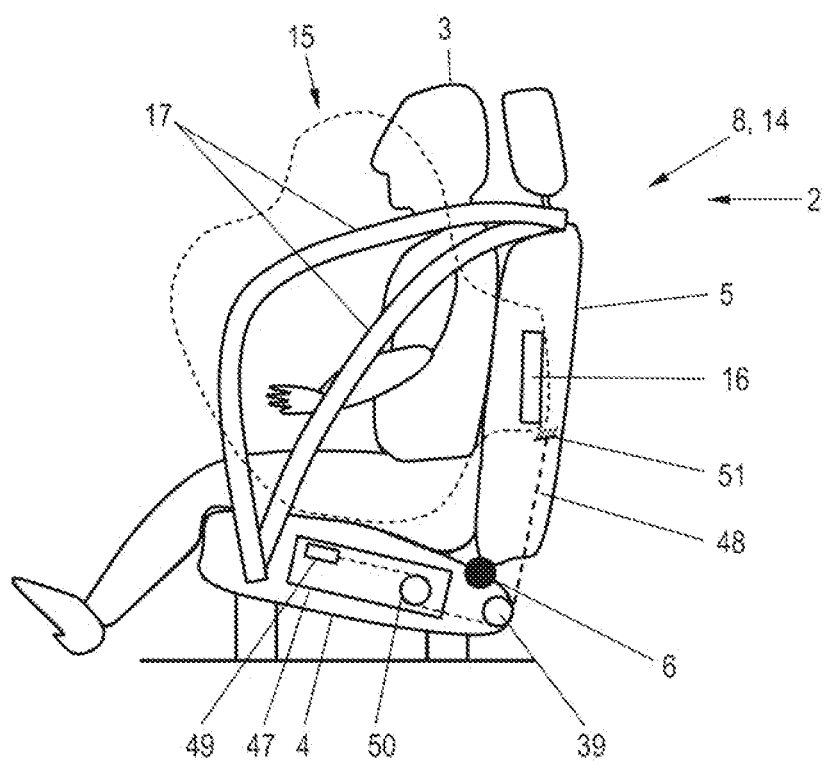
FIG. 7 shows a side view of a seat of a further example of a motor vehicle according to an example of the invention, in which a passenger is sitting.

FIG. 7 shows the seat 2 of a further exemplary embodiment of the motor vehicle 1 according to the invention, with identical components being provided with the same reference signs and consequently that which is explained in this regard in conjunction with the above-explained embodiment equally applying here. The view of the seat 2 that is shown in FIG. 7 corresponds to the view or situation shown in FIG. 4, with the first seatbelt arrangement 7 also being provided next to the second seatbelt arrangement 8 in the seat 2 of FIG. 7, even though this is not shown specifically.

The seat 2 shown in FIG. 7 differs from the above-explained exemplary embodiment in that, instead of the force generator 35, a limiting device 47 which is fastened to the seat body 4 is provided. A currently released pivoting path, i.e. a maximum possible pivoting limit, of the backrest 5 is adjustable by the limiting device 47. Until the pivoting limit is reached, the restoring effect is undertaken exclusively on the basis of the initially elastic and subsequently plastic deformation of the backrest 5. When the pivoting limit is reached, further pivoting of the backrest 5 is not possible.

This is made possible by the fact that the limiting device 47 is connected to the backrest 5 via a metal locking cable 48. When the pivoting limit is reached, the locking cable 48 comes under tensile stress, with a corresponding counterforce being applied by the limiting device, said counterforce preventing further pivoting of the backrest 5, apart from an elastic stretching of the locking cable 48.

Figure 8:
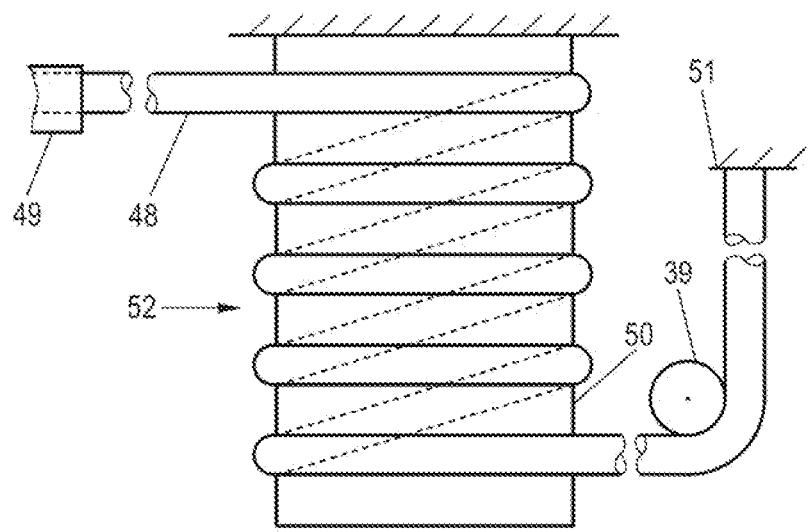
FIG. 8 shows an example of an enlarged view of a rotationally fixed cylinder of a limiting device of the seat of FIG. 7.

The limiting device 47 comprises a release device 49 and a cylinder 50 which is rotationally fixed with respect to the seat body 4, with details in this regard being apparent from FIG. 8. The locking cable 48 is wound repeatedly around the cylinder 50 between the release device 49 and a traction apparatus fastening point 51 of the backrest 5 in order to form a winding 52. On the basis of this configuration, the backrest 5 is pivoted to the maximum possible extent when the locking cable 48 is under tensile stress between the release device 49 and the traction apparatus fastening point 51. Said pivoting limit can be stopped or extended by the release of an additional section of the locking cable 48 by the release device 49, specifically until the pivoting of the backrest 5 has progressed to such an extent that the locking cable 48, which has slipped over the cylinder 50, comes again under tensile stress. In the present case, although not shown specifically in the figures, the release device 49 is a mechanical locking mechanism comprising a pawl engaging in a ratchet, the locking mechanism being able to be used to release the additional section of the locking cable 48 and blocking further release of the locking cable 48 when the backrest 5 has reached the pivoting limit.

Figure 9:
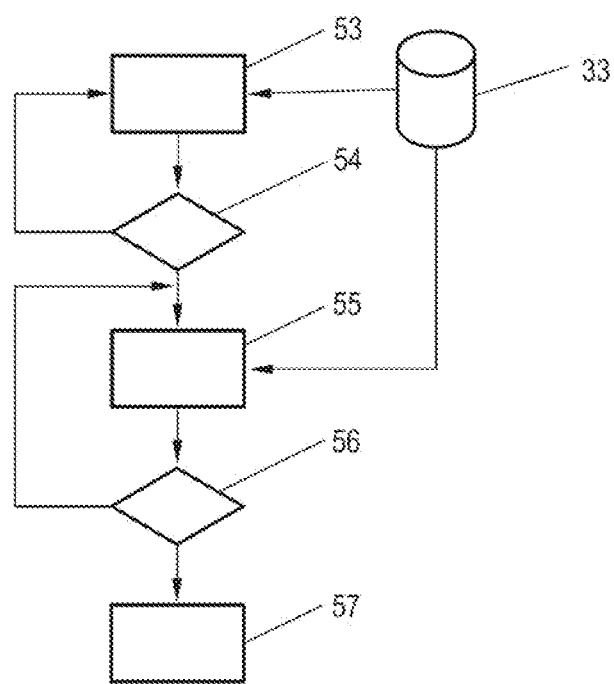
FIG. 9 shows a flow diagram of a further exemplary embodiment of the method which is explained on the basis of the motor vehicle, the seat of which is illustrated in FIG. 7.

A further exemplary embodiment of the method according to the invention is explained below and with reference to FIG. 9, specifically on the basis of the motor vehicle 1 comprising the seat 2 which is shown in FIG. 7. This method, the flow diagram of which is shown in FIG. 9, comprises operations 53 to 57.

In the first operation 53, analogously to the operation 19 of the first exemplary embodiment of the method according to the invention, the acceleration information 33 is ascertained, with reference regarding details of the acceleration information 33 being made to the first exemplary embodiment. Consequently, in contrast to the first exemplary embodiment, the ascertaining of the passenger information 25 is not provided in the second exemplary embodiment. The method explained on the basis of FIG. 9 is consequently carried out independently of the weight and the height of the passenger 3.

In the next operation 54, the meeting of the triggering condition is checked. This is met whenever the acceleration information 33 indicates that the value of the current acceleration of the motor vehicle 1 exceeds a predetermined acceleration limit value, and therefore it is very highly likely that there is a collision of the motor vehicle 1. When the triggering condition is not met, the method is continued in operation 53, in which the acceleration information 33 is detected again and updated.

When the triggering condition is met, the method is continued in operation 55. In this operation, the side airbag 15 is inflated. Furthermore, the additional section of the locking cable 48 is released by the limiting device 47, the length of said locking cable depending on the characteristic curve 58 shown in FIG. 10. Regarding the system of coordinates depicted in FIG. 10, the abscissa 41 relates to the current acceleration of the motor vehicle 1 and the ordinate 59 to the length of the released section of the locking cable 48. The dashed line 43 identifies the acceleration limit value, upon the exceeding of which the triggering condition is met.

The advantageous effects of said acceleration-dependent limiting of the pivoting forwards movement of the backrest 5 will be explained below. It is assumed that a very tall and heavy passenger 3 is sitting in the seat 2. The inertial force of said passenger is transmitted in the event of a crash to the backrest 5 via the seatbelt arrangements 7, 8, as a result of which the backrest 5 is pivoted forwards. Until the pivoting limit is reached, the corresponding counterforce is generated on the basis of the plastic and/or elastic deformation of the backrest 5, with, in contrast to the situation in which the pivoting-forwards movement would not be limited, a maximum pivoting of the backrest 5, in which the passenger comes into contact with a dashboard of the motor vehicle 1, would be achieved much earlier or at a much smaller acceleration than this is the case for a small and light passenger.

Figure 10:
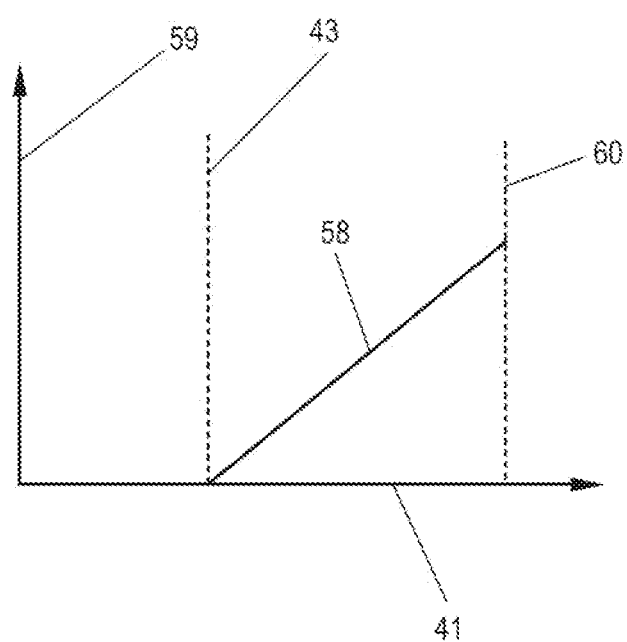
FIG. 10 shows an example of a characteristic curve relating to the relationship between the current acceleration and the tensile force generated by the limiting device.

According to the characteristic curve 58 shown in FIG. 10, the length of the released section of the locking cable 48 increases, and therefore also the maximum possible pivoting path of the backrest 48 increases, by way of example linearly, as the acceleration increases. This increase takes place until a maximum value of the acceleration, indicated by the dashed line 60, is reached. The maximum value of the acceleration is the acceleration at which a comparison passenger of predetermined weight and predetermined height would come into contact with the dashboard of the motor vehicle 1 because of the restoring effect of the backrest 5 that is not limited by the limiting device 47 and is exclusively elastic and/or plastic. The limiting device 47 therefore prevents a large and heavy passenger 3, in comparison to the comparison passenger, from striking against the dashboard even at smaller acceleration values.

While operation 55 is being carried out, the acceleration information 33 is continuously updated, with the meeting of a termination condition being checked parallel thereto within the scope of operation 56. Said termination condition is met as soon as the acceleration of the motor vehicle 1 drops again below the acceleration limit value, indicated by the dashed line 43. When this is not the case, operations 55 and 56 are passed through again with continuous detection and consequently updating of the acceleration information 33. As soon as the termination condition is met, the method is ended within the scope of the final operation 57 and optionally started once again at operation 53.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for securing a passenger in a motor vehicle in a collision, the motor vehicle including a seat which comprises a seat body forming a seat surface, and a backrest connected to the seat body, wherein an inertial force acting on the passenger in the seat in a collision is transmitted by a seatbelt arrangement to the backrest in such a manner that the backrest pivots forwards relative to the seat body counter to a restoring effect of an elastic and/or plastic deformation of at least part of the backrest, the method comprising:
   generating, by a force generator, a force to counteract the pivoting-forwards action of the backrest, and transmitting the force to the backrest and/or limiting, by a limiting device, a maximum pivoting path of the backrest; and
   minimizing, when a predetermined reference acceleration is present, a deviation between an actual pivoting path of the backrest and a predetermined reference pivoting path.

2. A method according to claim 1, further comprising acquiring, by an acceleration sensor, acceleration information relating to the current acceleration of the motor vehicle, wherein the force and/or the limiting of the maximum possible pivoting path is predetermined depending on the acceleration information.

3. A method according to claim 2, wherein
   a characteristic curve describing a relationship between the current acceleration of the motor vehicle and the force and/or the maximum possible pivoting path is predetermined and on the basis of which the force is generated and/or the limiting of the maximum possible pivoting path is predetermined.

4. A method according to claim 1, wherein the force and/or the limiting of the maximum possible pivoting path is predetermined depending on passenger information, the passenger information including weight and/or height of the passenger.

5. A method according to claim 4, further comprising retrieving the passenger information from a vehicle controller.

6. A method according to claim 4, further comprising retrieving the passenger information from a sensor.

7. A method according to claim 1, further comprising:
reducing, by the force generator, a value of the force which counteracts the pivoting-forwards action when or after a maximum pivoting path of the backrest.

8. A method according to claim 7, further comprising:
setting to zero a value of the force which counteracts the pivoting-forwards action when or after a maximum pivoting path of the backrest.

9. A motor vehicle comprising:
at least one seat including a seat body having a seat surface, and a backrest connected to the seat body, wherein an inertial force acting on a passenger in the seat in a collision is transmitted by at least one seatbelt arrangement to the backrest in such a manner that the backrest pivots forwards relative to the seat body counter to a restoring effect of an elastic and/or plastic deformation of at least part of the backrest;
a control device to activate a force generator and/or a limiting device of the motor vehicle such that
a force which counteracts the pivoting-forwards action is generated by the force generator and transmitted to the backrest, and/or
a maximum possible pivoting path of the backrest is limited by the limiting device,
wherein when a predetermined reference acceleration is present, a deviation between an actually present pivoting path of the backrest and a predetermined reference pivoting path is minimized.

10. A motor vehicle according to claim 9, wherein the force generator comprising an electromechanical actuator to generate the force to counteract the pivoting-forwards action to transmit to the backrest.

11. A motor vehicle according to claim 9, wherein the force generator comprising a damping element having a damping fluid to generate the force to counteract the pivoting-forwards action to transmit to the backrest.

12. A motor vehicle according to claim 9, wherein the force generator to generate a tensile force and transmit the tensile force to the backrest via a traction apparatus.

13. A motor vehicle according to claim 12, wherein the traction apparatus firstly is connected to the force generator and secondly is fastened to the backrest, the traction apparatus comprising a metal traction cable or a belt.

14. A motor vehicle according to claim 12, further comprising:
at least one deflecting pulley rotatably fastened to the seat body or to the backrest, wherein the traction apparatus being guided around the at least one deflecting pulley.

15. A motor vehicle according to claim 13, further comprising:
at least one deflecting pulled rotatably fastened to the seat body, wherein the traction apparatus being guided around the at least one deflecting pulley.

16. A motor vehicle according claim 9, wherein when the maximum possible pivoting path of the backrest is limited by the limiting device, the limiting device is connected to the backrest via a locking cable.

17. A motor vehicle according to claim 16, wherein
the limiting device including a release device and a rotationally fixed cylinder, and
the locking cable is wound around the cylinder between the release device and a locking cable fastening point of the backrest, wherein an additional section of the locking cable can be released by the release device.

18. A motor vehicle according to claim 17, further comprising: an acceleration sensor to ascertain acceleration information relating to a current acceleration of the motor vehicle, wherein the control device to activate the release device in such a manner that the additional section of the locking cable is released with a length depending on the acceleration information.

19. A motor vehicle according to claim 9, wherein
passenger information including weight and/or height of the passenger is retrieved from a vehicle controller and/or is ascertained by a sensor, and
the control device is designed such that the force and/or the limiting of the maximum possible pivoting path is predetermined depending on the passenger information.

20. A motor vehicle according to claim 9, wherein the sensor including a weight sensor in or on the seat body and/or an optical sensor to detect image data of a passenger compartment and/or of surroundings of the motor vehicle and/or a fingerprint sensor to detect a fingerprint of the passenger.

21. A motor vehicle according to claim 9, wherein the seatbelt arrangement including a three-point belt arrangement or a four-point belt arrangement or an airbag belt arrangement, by which at least one airbag including a side airbag of the seat is connected to the backrest.

* * * * *

UNITED STATES PATENT AND TRADEMARK OFFICE
CERTIFICATE OF CORRECTION

PATENT NO. : 12,233,805 B2
APPLICATION NO. : 18/130633
DATED : February 25, 2025
INVENTOR(S) : Bernd Jakobs et al.

Page 1 of 1

It is certified that error appears in the above-identified patent and that said Letters Patent is hereby corrected as shown below:

In the Claims

Column 16, Line 16:
In Claim 16, after "according" insert -- to --.

Signed and Sealed this
Third Day of June, 2025

Coke Morgan Stewart
*Acting Director of the United States Patent and Trademark Office*